RUCKER, ALLEN & SMITH.
Ambulance.

No. 59,459.

Patented Nov. 6, 1866.

Witnesses.
C. D. Smith
James L. Ewin

Inventor.
D. H. Rucker
John E. Allen
J. S. Smith
By Munn & Co
Attys

UNITED STATES PATENT OFFICE.

D. H. RUCKER, JOHN E. ALLEN, AND JACOB S. SMITH, OF WASHINGTON, DISTRICT OF COLUMBIA.

IMPROVEMENT IN AMBULANCES.

Specification forming part of Letters Patent No. 59,459, dated November 6, 1866.

*To all whom it may concern:*

Be it known that we, D. H. RUCKER, JOHN E. ALLEN, and JACOB S. SMITH, all of the city and county of Washington, in the District of Columbia, have made certain new and useful Improvements in Ambulances; and we do hereby declare the following to be a full, clear, and exact description of the same, reference being had to the accompanying drawings, which are made a part of this specification, and in which—

Figure 1:
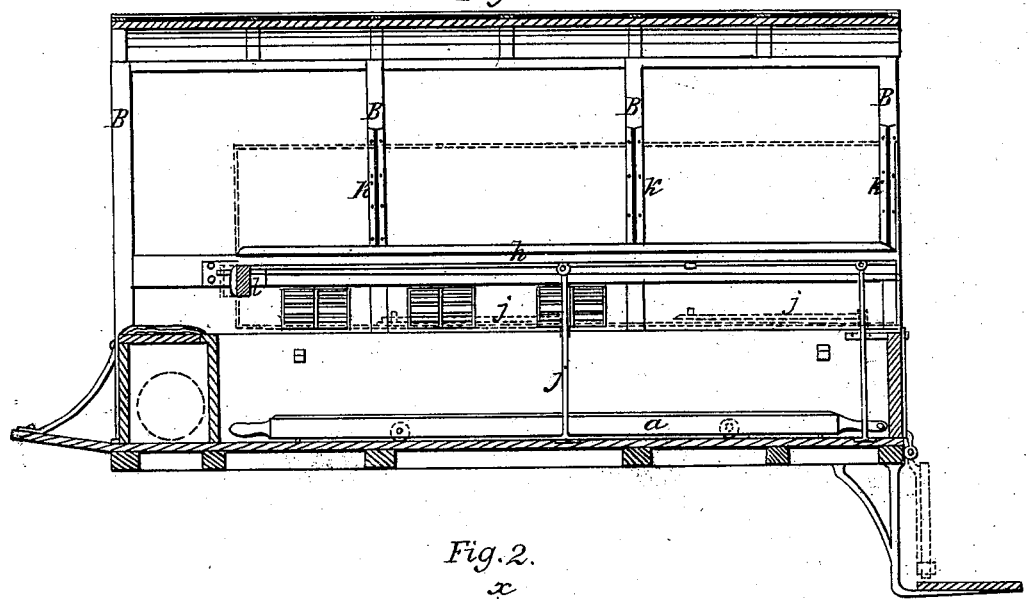
Figure 2:
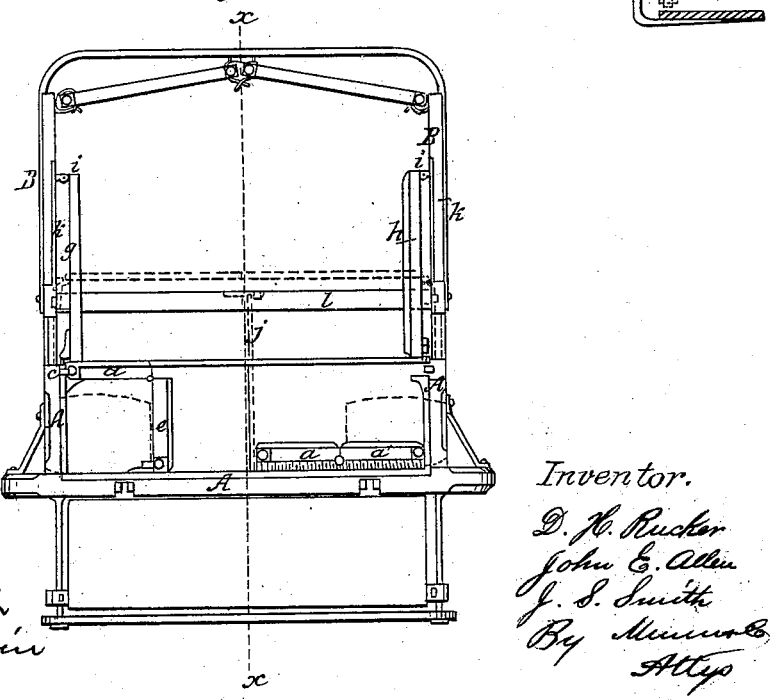

Figure 1 is a central longitudinal vertical section on the line *x x*, Fig. 2. Fig. 2 is a rear elevation.

Similar letters of reference indicate corresponding parts in the two figures.

The object of our improvement is to construct an ambulance which shall carry two tiers of stretchers, two patients in each tier, or shall accommodate riding patients on seats with backs at the sides of the vehicle.

The following description will enable others skilled in the art to which our invention appertains to fully understand and use the same.

A is the bed of the ambulance, and B is the frame of the cover. We shall confine ourselves especially to the points of novelty.

On the floor of the vehicle are two stretchers suited for carrying one patient each, and each divided by a longitudinal hinge-joint. These stretchers are shown at *a a'* and *d e*. They have the usual handles, and run on elastic rollers, so as to move readily longitudinally in the bottom of the ambulance. When required as seats the joints of the stretchers are bent, and the two parts are made to assume a position at right angles to each other, the half *d*, which has the horizontal position, being hooked to the side of the vehicle at *c*, the other part, *e*, forming the support for the front of the seat.

When the lower bed or stretcher is thus bent to form a seat the upper portions, *g h*, which form beds for two patients, as shown in Fig. 1 and by red lines in Fig. 2, are turned down to make backs for the seats, as shown in the lower figure in black lines. One side may thus be provided with a seat and back, and the other side have two beds; or the ambulance may contain four beds, or be adapted for carrying men sitting on each side with backed seats.

The stretchers below are provided with pins *c'*, which hook into lugs *c* on the side of the vehicle when the stretcher is folded to form a seat.

The change of the upper beds is made as follows: One side of the bed-frame *g*, for instance, is provided at three points with rods or pieces *i i*, which are attached to the frame *g*, and arranged to slide in the slotted plates K K, which are attached to the bows of the cover. The other edge of the frame *g* or *h* is provided with legs *j*, which, when the frame is used as a bed, fall vertically and support the frame; but when the frame is used as a seat-back the legs *j* are hooked up against the under side of the frame. As the frame *g* or *h* assumes one or the other of these positions the pieces *i* slide up or down in the guides K, as seen in the respective views Figs. 1 and 2.

The sliding bar *l* forms an additional support for the upper tier of beds when used as such, and has a forward and backward adjustment, as shown in red and black lines in Fig. 1. In the forward position it rests against the ends of the frames *g* and *h*, and in the backward position their ends rest upon it.

Having thus described our invention, the following is what we claim as new, and desire to secure by Letters Patent—

1. The within-described ambulance accommodation, consisting of the beds or stretchers *a a' d e g h*, adapted to contain two tiers of recumbent patients, or be converted into one or more backed seats, substantially as and for the purpose described.

2. The upper hinged beds or stretchers, *g h*, employed in connection with the lower beds or stretchers of an ambulance, so as to constitute seat-backs when the lower beds are converted into seats, substantially as and for the purpose herein set forth.

The above specification of our improvement in ambulances signed this 20th day of June, 1866.

D. H. RUCKER.
          J. E. ALLEN.
          J. S. SMITH.

Witnesses:
    JAMES EVELETH,
    W. C. THOMAS.